(12) United States Patent
Eriksson

(10) Patent No.: US 8,170,030 B2
(45) Date of Patent: May 1, 2012

(54) LOCATOR RESOLUTION IN COMMUNICATIONS NETWORKS

(75) Inventor: Anders E. Eriksson, Kista (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 348 days.

(21) Appl. No.: 12/377,914

(22) PCT Filed: Sep. 3, 2007

(86) PCT No.: PCT/EP2007/059188
§ 371 (c)(1),
(2), (4) Date: Feb. 18, 2009

(87) PCT Pub. No.: WO2008/028890
PCT Pub. Date: Mar. 13, 2008

(65) Prior Publication Data
US 2010/0166003 A1   Jul. 1, 2010

(30) Foreign Application Priority Data

Feb. 9, 2007   (WO) .................. PCT/SE2007/050083

(51) Int. Cl.
*H04L 12/28* (2006.01)
*H04L 12/56* (2006.01)

(52) U.S. Cl. ..................... 370/395.3; 370/352; 370/359; 370/363; 370/381; 370/389

(58) Field of Classification Search .................. None
See application file for complete search history.

(56) References Cited

U.S. PATENT DOCUMENTS

| | | | |
|---|---|---|---|
| 6,973,057 B1 | 12/2005 | Forslow | |
| 7,203,175 B2 | 4/2007 | Thubert et al. | |
| 7,333,461 B2 | 2/2008 | Thubert et al. | |
| 7,428,221 B2 | 9/2008 | Thubert et al. | |
| 7,453,842 B2 * | 11/2008 | Yamamoto | 370/328 |
| 2002/0098840 A1 | 7/2002 | Hanson et al. | |

(Continued)

FOREIGN PATENT DOCUMENTS

CN   1675896 A   9/2005

(Continued)

OTHER PUBLICATIONS

International Search Report for PCT/EP2007/059188 mailed Dec. 27, 2007.

(Continued)

*Primary Examiner* — Ayaz Sheikh
*Assistant Examiner* — Blanche Wong
(74) *Attorney, Agent, or Firm* — Nixon & Vanderhye P.C.

(57) ABSTRACT

A set of globally-reachable attachment registers is provided for objects in an internetwork of interconnected communications networks. "Objects" can be networks, hosts or terminals, or passive objects which themselves do not have a network interface. Each attachment register corresponds to an object in the internetwork. The attachment registers are not located with their respective object. Information is stored in the attachment registers that establishes one or more logical links between the attachment registers. The information is used to perform one or more network communication functions, and in particular to determine a locator by identifying a logical path, along the logical links between attachment registers, from a destination attachment register corresponding to the destination object. Other non-limiting example functions include location registration and update, name to global locator resolution, routing, multi-homing, dynamic ISP selection, and handover.

37 Claims, 9 Drawing Sheets

U.S. PATENT DOCUMENTS

| | | | |
|---|---|---|---|
| 2003/0092443 | A1 | 5/2003 | Hiyama et al. |
| 2004/0032852 | A1 | 2/2004 | Thubert et al. |
| 2004/0163024 | A1 | 8/2004 | Kawai et al. |
| 2006/0291404 | A1 | 12/2006 | Thubert et al. |
| 2007/0086359 | A1 | 4/2007 | Yaqub |
| 2007/0153707 | A1 | 7/2007 | Thubert et al. |
| 2007/0195826 | A1 | 8/2007 | Wang et al. |

FOREIGN PATENT DOCUMENTS

| | | |
|---|---|---|
| EP | 1 515 505 | 3/2005 |
| WO | WO 02/100071 | 12/2002 |
| WO | WO 2007/145552 | 12/2007 |

OTHER PUBLICATIONS

International Preliminary Report on Patentability for PCT/EP2007/059188 mailed Nov. 24, 2008.

U.S. Appl. No. 11/515,381, filed Sep. 5, 2006; Eriksson.

Office Action mailed Apr. 3, 2009 in co-pending U.S. Appl. No. 11/515,381.

Office Action mailed Nov. 12, 2009 in co-pending U.S. Appl. No. 11/515,381.

Office Action mailed Mar. 1, 2011 in co-pending U.S. Appl. No. 11/515,381.

Devarapalli et al., RFC 3963—Network Mobility (NEMO) Basic Support Protocol, http://www.ietf.org/rfc/rfc3963.text.

RFC 2136—Dynamic Updates in the Domain Name (DNS Update), http://www.faqs.org/rfcs/rfc2136.html.

Notification of Transmittal of the International Search Report and the Written Opinion of the International Searching Authority in PCT/SE2007/050083 dated Dec. 6, 2007.

Caesar et al., ROFL: Routing on Flat Labels, University of California at Berkeley, SIGCOMM'06, Sep. 11-15, 2006, Pisa, Italy.

Eriksson et al., Dynamic Internetworking Based on Late Locator Construction, IEEE Global Internet Symposium 2007, May 11, 2007, pp. 67-72.

Ahlgren et al., A Node Identify Internetworking Architecture, Apr. 29, 2006.

Chinese Office Action and English translation of Office Action mailed Mar. 24, 2011 in corresponding Chinese Application No. 2007800329286.

Office Action issued for U.S. Appl. No. 11/515,381, issued Oct. 5, 2011.

* cited by examiner

- $AR_x$   Attachment Register for host or moving network x
- H   host
- LR   Location Register
- M   Moving Network
- old host locator:   a/c/f/j/$h_k$
- new host locator:   b/d/f/j/$h_k$

LOCATOR RESOLUTION IN COMMUNICATIONS NETWORKS

This application is the U.S. national phase of International Application No. PCT/EP2007/059188 filed 3 Sep. 2007 which designated the U.S. and claims priority to U.S. application Ser. No. 11/515,381 filed 5 Sep. 2006 and International Application No. PCT/SE2007/050083 filed 9 Feb. 2007, the entire contents of each of which are hereby incorporated by reference.

TECHNICAL FIELD

The present system relates to packet communications in data networks, and more particularly, to locator resolution and routing issues in communication networks such as name-to-address resolution and name-address registration.

BACKGROUND

Name-address management generally includes issues such as name-to-address resolution and name-address registration. Name-to-address resolution is a procedure by which a "name" of a network resource, e.g., a network node, is resolved or translated into a routable network address, i.e., a location in the network topology. Name-address registration is the corresponding registration procedure by which the name and the assigned network address of the resource are registered in the network. The name of the resource is normally known to users and typically also stays the same over relatively long periods of time.

Traditional networking architectures for the Public Switched Telephone Network (PSTN) or Internet solve the problem of connecting terminals or hosts (which can be considered as "boxes") in order to support a specific application such as telephony or WWW. To this end, traditional naming and addressing schemes employ host or network centric identities such as E.164 numbers for telephony, or Internet Protocol (IP) addresses and Uniform Resource Locators (URLs) for the Internet. However, the end user is typically interested in reaching a destination object that sits behind or within the box, such as a human being or a file, rather than communicating with the box itself. As the destination objects move to new boxes, box or network dependent identities of these objects must be updated. For example, it is an everyday experience that a person cannot be reached at the phone number registered in some semi-static directory because that directory does not track the phone that she is momentarily close to. Or a web link is broken because the target data object has been moved to another location. To address this class of problems, box-independent addressing schemes such as Telephone Number Mapping (ENUM), Session Initiation Protocol (SIP) names, and Uniform Resource Identifiers (URIs) have been developed. Using a presence or mobility mechanism, box-independent names of a destination object can then be mapped to the address of the box where the destination object is currently located. Likewise, inventory systems are used to track specific objects to a specific location.

In addition, it is quite common that mobile objects travel within or in association with other mobile objects. For example, a person may travel in association with a mobile phone that may be associated with a personal area network that may be associated with a vehicular network. Consider, for example, a person using a laptop with a Wireless Local Area Network (WLAN) who is working onboard a train that has Internet connectivity. To reach this person, three separate mobility-related functions must be used: 1) a presence function that binds the person to the laptop, 2) a mobility function that binds the laptop to a specific IP address on the train, and 3) a mobility function for the train.

Another example is a piece of merchandise that travels in a container that travels on a ship. For this case a separate inventory system would be used with little in common with the functions for personal and host mobility described in the previous example.

The Domain Name System (DNS) stores and provides information associated with domain names in a distributed database in networks such as the Internet. The DNS associates domain names with many types of information, but most importantly it provides the IP address for a given domain name. DNS makes it possible to associate easy-to-remember domain names (such as ericsson.com) with hard-to-remember IP addresses. DNS is suitable for resources that rarely change their location, but is not adapted for mobility. RFC 2136 describes "*Dynamic Updates in the Domain Name System*" in the hope of providing better support for rapid updates of DNS, but it is still far from being suitable for keeping track of roaming resources such as mobile phones and their users.

When routing protocols for the Internet and other fixed networks were initially created, hosts were not expected to move around. Therefore, hosts are usually named by their point of attachment to the network, e.g., IP addresses. Examples of such routing protocols include RIP, IS-IS, OSPF, BGP and PNNI. They are all well established technologies but have limited support for mobility and have convergence problems when network topologies change rapidly.

Traditionally, applications use IP-addresses in a way that does not allow them to change during an on-going session. To allow hosts to move without changing their IP-addresses (at least from an application perspective) mobility solutions in IP networks, such as Manet (ad hoc networks), Network Mobility (NEMO), and Mobile IP have been developed. But these are fairly complex solutions since they adapt a technology intended for fixed networks to new mobility requirements. In addition, there is a multitude of inventory systems for various classes of objects, such as library books or pieces of merchandise. Each system and mechanism is optimized for its specific class of objects. For example, mobile IP is optimized for mobility of IP boxes, SIP supports personal mobility, inventory systems handle mobility of goods, etc. Due to the diverse technologies employed in this field, it is hard to achieve synergies between the systems and mechanisms used for the different classes of mobile objects.

The Host Identity Protocol (HIP) provides a method of separating the end-point identifier and locator roles of IP addresses. It introduces a new Host Identity (HI) name space based on public keys. The public keys are typically self-generated. The HIP separation can be used to provide end-to-end connectivity over different locator domains. Even still, routing protocols under development cater to mobility of individual hosts (nodes) but do not adequately address the problems relating to mobile networks (MNs). A mobile network includes a group of many mobile hosts or other objects that move together as a group. Mobile network examples include networks located in any type of mobile vehicle, e.g., in a train, airplane, bus, ship, subway, etc., but are not limited to vehicles. All that is required is that the group of mobile objects, hosts and routers move substantially together at substantially the same time. Also, a communication satellite carrying a router is another example of a mobile network that dynamically attaches to ground stations, other communication satellites, and hosts or mobile phones. A particular mobility problem associated with mobile networks is a potentially huge number of registration or other location updates that need to be signalled and processed whenever the mobile network changes location. Such a move may cause an "update storm."

Consider for example a Public Land Mobile Network (PLMN) type of system like GSM and 3G cellular networks. Mobile host name resolution is handled via a Home Location Register (HLR) and the Visited Location Register (VLR). When a mobile host is called, a phone number (MS-ISDN) is resolved via the VLR and HLR into a corresponding E.164 address that allows the call to be routed to the mobile host, if the mobile host with the MS-ISDN has registered its current location area with the VLR. Local mechanisms are used to route the call to the specific cell in the location area in which the mobile host is currently located.

The HLR and VLR have overall good performance and security support regarding name resolution in cellular systems. But they are closely linked to the E.164 address structure and as such do not provide an open architecture for other and/or arbitrary name and address spaces. Moreover, this approach to registering a host with a centralized location register like the HLR/VLR does not function well with mobile networks. The problem is particularly acute when a large mobile network with many subnetworks or hosts roams and requires registration update signalling for every one of its subnetworks and/or hosts—a good example of an "update storm" mentioned above.

In dynamic DNS, when such a mobile network roams, each host in the mobile network must have its DNS record updated. For that situation, mobile IP requires that all home agents having hosts in the mobile network be updated. RFC 3963 describes the IETF Network Mobility (NEMO) basic support protocol which enables mobile networks to attach to different points in the Internet. The protocol is an extension of mobile IPv6 and allows session continuity for every node in the Mobile Network as the network moves. It also allows every node in the Mobile Network to be reachable while mobile around. But NEMO's distributed solution suffers from what is called "pinball routing," where all internetwork traffic must be routed between every mobility agent that has an associated mobile node or network in the path towards the destination host. As a result, tunnelling overhead accumulates per radio hop, and there are potential latency problems when several mobility agents are located at different continents, i.e., x-ogonal routing instead of triangular routing.

Thus none of the existing systems is designed to handle the nested mobility problem where mobile objects travel in association with other mobile objects. The NEMO solution described above is designed to handle nested mobility of networks and hosts, but not for mobile objects in general. Existing systems for the handling of digital objects, such as the Handle System for naming and accessing digital objects (RFC 3650) do not address the issue of updating the locator of a mobile object in a scalable fashion.

SUMMARY

In accordance with one aspect there is provided a set of globally-reachable attachment registers for use in an internetwork of interconnected communications networks. Each attachment register corresponds to an object in the internetwork. Information is stored in the attachment registers that establishes one or more logical links between attachment registers. Each logical link between attachment registers corresponds to a communication link between neighbouring objects in the internetwork. A locator for a destination object in the internetwork is determined by identifying a logical path, along the logical links between attachment registers, from a destination attachment register corresponding to the destination object.

For purposes here, the term "locator" is a general term that covers any type of communications network address or identifier that allows a communications node in communications network to be located within the communications network topology. Examples include a name resolution of the destination object and an optimal network path between a source object and the destination object. It may also apply to a physical position or physical path. This can be achieved if some or all of the attachment registers include information identifying a physical location of their corresponding object, and/or a relative physical location of their corresponding object compared to neighbouring objects.

The term "object" is intended to encompass any feature of the interconnected networks. It includes networks themselves (including such networks as PANS and VANs), hosts and terminals, in addition to passive objects which themselves do not have a network interface. Such passive objects may include human beings, data files, physical containers of information such as books, sensors, vehicles, merchandise, or any physical object that can register with a network node using a readable medium such as an RFID tag, PIN code or bar code.

Preferably communication links with neighbouring objects are registered with the corresponding attachment register of each object. A passive object (i.e. without a network interface) cannot do this directly but may instead be associated with one or more active objects (e.g. hosts) as proxies. The proxy may therefore register communication links with attachment registers on behalf of their associated passive objects.

The determination of the logical path along logical links between attachment registers may be conducted in accordance with a predefined policy of preferred objects to be included in locator construction. This enables users to control, for example, which from a number of applications is used to receive data.

In one embodiment, construction of the locator may include sending a locator constructor request to the destination attachment register. At the destination attachment register, the name of the destination object is added to the location constructor request. The locator constructor request is then forwarded to another attachment register corresponding to an neighbouring object closer to a root network than the destination object. This process is then repeated until the locator constructor request returns to the sender and contains the names of all the objects corresponding to the attachment registers passed through by the locator constructor request.

A session initiation request may also be included with the locator construction request. This enables the integration of session initiation and locator construction, reducing the overall signalling required.

In an example implementation, the attachment registers are not located with their respective object, and the interconnected networks, hosts and other objects may be configured as a hierarchical network topology. The attachment registers are preferably located in a network at a highest level of the hierarchical topology. The logical links include an association with a name of a network or host and a pointer associated with a neighbour network of that network or host. The logical links may be established as part of a registration operation. The pointer points to one or more of the following: a name of the neighbour network, a global locator of the attachment register corresponding to the neighbour network, and a combination of a name of the neighbour network and a local locator of a point of attachment to the neighbour network. The logical link for a network closest to a highest level network in the hierarchy includes an association with a name of the closest network and a pointer pointing to a highest level network locator associated with a point of attachment of the closest network to the highest level network.

In one example non-limiting application, at least some of the objects are mobile. This may mean that at least some of the networks are mobile networks and at least some of the hosts are mobile hosts. Passive objects may also be mobile. The attachment registers do not store a global locator of each mobile object's current location.

When an object (mobile or fixed) changes from a first point of attachment at an old neighbour object to a second point of attachment at a new neighbour object, the attachment register corresponding to that object is simply updated to change a logical link from the attachment register corresponding to the first neighbour object to the attachment register corresponding to the second neighbour object. Updates for the attachment registers associated with other hosts and networks affected by this changed location of the network are not required.

One important use for the logical link information is name-locator resolution. One or more of the globally-reachable attachment registers may be queried to obtain or modify logical link information in the one or more attachment registers. Each object has a name and is addressable using a corresponding network locator. The logical link information may be used to resolve a name of an object to a global network locator of a host attached to one of the networks. A correspondent host queries a sequence of attachment registers associated with the object and with networks located in the internetwork along a path between the object and a highest level network to generate a list of items including the host name, names of networks traversed along the path, and a locator of an attachment point to the highest level network. The correspondent host uses the list of items to generate the global network locator of the object.

Traditional routing provides a network path between source and destination boxes that have locators such as IPv4 or E.164 addresses. The present system is a network mechanism that provides a network path between any set of objects that can register with a network node. The mobility update signalling can be handled for a very large number of nested mobile objects (i.e. reached via other mobile objects) in a scalable fashion.

Advantageously, the attachment register-based technology prevents roaming events at or close to higher levels of the network topology from requiring other objects in or near the network topology to update their location registrations. Only an object that changes its local point of attachment needs to update its location registration in its attachment register. Because name registration is performed in a distributed fashion, each host and network only needs to register with its dedicated attachment register. There is no need for a centralized location register (e.g., like an HLR or VLR in a cellular network) that handles all mobility or other location registrations. Significantly, in a mobile network context, "update storms" are avoided because all lower level hosts and networks in the network topology do not have to update their mobility registrations when a mobile network at a higher level in the network topology moves to a new attachment point. The global locator obtained in the name-locator resolution procedure can be used to route a packet along the most suitable path from a source to a destination, thus avoiding the so-called pin-ball routing problem of the NEMO solution. Typically the packet is first forwarded from the source to the root network, using either the source locator or a default path to find a path to the root network. In the next step the packet is forwarded from the root network to the destination using the destination locator. If the source and destination are within a small number of hops from each other, it is possible to find a direct path from the source to the destination without forwarding via the root network. Regardless of which alternative is used, the pin-ball routing problem is avoided.

DETAILED DESCRIPTION

Figure 1:
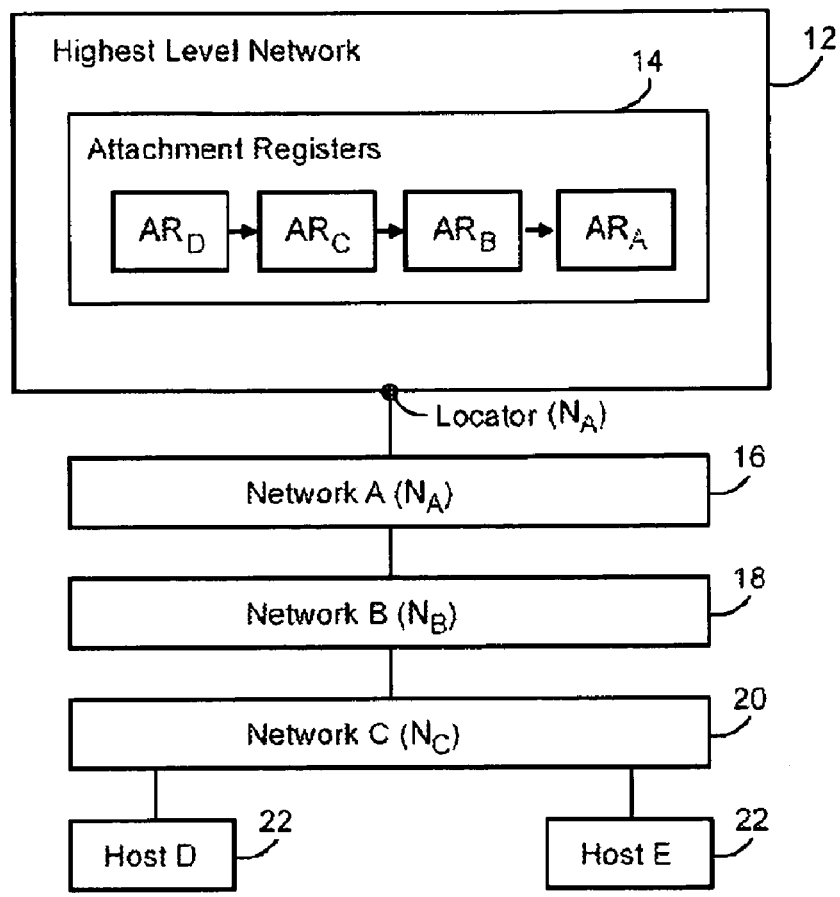
FIG. 1 is a function block diagram of a non-limiting example internetwork of networks and hosts in which a set of globally-reachable attachment registers is used to perform one or more network communication functions.

The following description sets forth specific details, such as particular embodiments, procedures, techniques, etc. for purposes of explanation and not limitation. But it will be appreciated by one skilled in the art that other embodiments may be employed apart from these specific details. For example, although the following description is facilitated using a non-limiting example application to mobile communication networks configured in a tree type network topology, this technology has application to any communications network application. In some instances, detailed descriptions of well known methods, interfaces, circuits, and devices are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

The technology provides a network name and location management architecture and methodology that facilitates and/or minimizes network management signalling in a variety of areas, some non-limiting examples of which include location registration and update, name to global locator resolution, routing, multi-homing, dynamic ISP selection, handover, and inventory control. One non-limiting example application is to mobile networks (as defined in the background), where each mobile network is coupled to multiple communication hosts, and each host corresponds to a communications node of some sort. Non-limiting example hosts include cell phones, lap top computers, and PDAs. Non-limiting examples of mobile networks include personal area networks (PANs) and vehicular area networks (VANs). A personal area network (PAN) is a network used for communication among electronic devices like phones, laptops, PDAs, MP3 players, etc. close to one person. The devices may or may not belong to that person in question. PANs can be used for communication among the personal devices themselves (intrapersonal communication), or for connecting to a higher level network and the Internet. The PAN may be wired or wireless, e.g., a piconet in BLUETOOTH. A vehicular area network (VAN) is used to interconnect networks and hosts within a vehicle, e.g., to interconnect PANs and hosts within a train. A VAN can also have connectivity with fixed networks, such as the Internet. In one (non-limiting) embodiment, mobile networks and hosts may be assumed to be interconnected in "tree" structure, where the root of a tree is a network attached to a root network. Branches interconnect adjacent networks, and each host connected to such a network is considered to be a leaf of the tree. However, other arrangements may also be envisaged and arbitrary edge topologies are also allowed. In such topologies, a parent-child relationship may be determined by a routing protocol which superimposes a logical spanning tree on the arbitrary edge topology. This spanning tree may describe the shortest path to the root network.

The following description describes first how a global locator concept can be put into operation with reference to hosts in a mobile network. It will be appreciated that this concept can be extended to include objects associated with hosts, and this is described subsequently.

FIG. 1 is a function block diagram of a non-limiting example internetwork 10 of networks 12, 16, 18, 20 and hosts 22 in which a set of globally-reachable attachment registers 14 is used to perform one or more network communication functions. As will become apparent, the globally-reachable attachment registers 14 can be viewed as a distributed database of sorts. Each attachment register may have a separate location, or the attachment registers may be distributed over different operators, where each operator has the option of locating its attachment registers in a centralized fashion. They are preferably, but not necessarily, located in a highest level network 12 in the internetwork configuration. Each attachment register is not located with its respective network or host. Alternatively, the database may be stored in the root network. In this example, each network A, B, and C in a path from the highest level network 12 to a host D has a corresponding attachment register $AR_A$, $AR_B$, and $AR_C$ as does host D. The attachment register of network A stores a locator of a point of attachment of network A to the highest level network 12. Not every network or host in the internetwork necessarily needs an attachment register.

Information is stored in the attachment registers that establishes one or more logical links between the attachment registers. In this example, the arrows indicate that information is stored in attachment register $AR_D$ that links or points to attachment register $AR_E$. Similarly, there is information stored in attachment register $AR_E$ that links or points to attachment register $AR_B$, and information is stored in attachment register $AR_B$ that links or points to attachment register $AR_A$. The information in these attachment registers creates a path to host D, and thus, allows easily construction of a global locator to host D. As mentioned, that information in these attachment registers can be used to perform other network communication functions as well. Some of the logical links are associated with communication links to neighbour networks and include a specification of performance parameters of that communication link including one or more of bandwidth, packet delay, or packet loss rate. Also, the attachment register of a network can store performance parameters for the edge-to-edge communication over that network.

Figure 2:
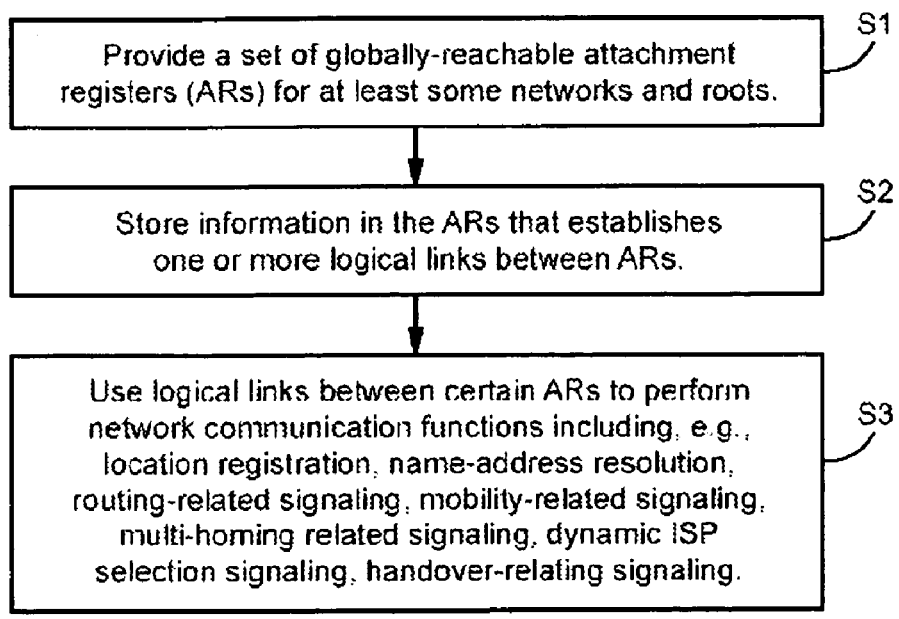
FIG. 2 is a flow chart diagram illustrating non-limiting, example procedures related to the attachment register based technology.

FIG. 2 is a flow chart diagram illustrating non-limiting, example procedures related to the attachment register based technology. A set of globally-reachable attachment registers is provided for interconnected communications networks and hosts (step S1). Globally-reachable means are sufficiently locatable in a network so that any host or node can communicate with any one of the attachment registers. At least some of the networks and hosts each has a corresponding attachment register. Information is stored in the attachment registers that establishes one or more logical links, between the attachment registers (step S2). The logical link information in certain ones of the attachment registers is used to perform one or more network communication functions (step S3). Non-limiting example functions include location registration and update, name to global locator resolution, routing, multi-homing, dynamic ISP selection, handover, and physical location determination.

Figure 3:
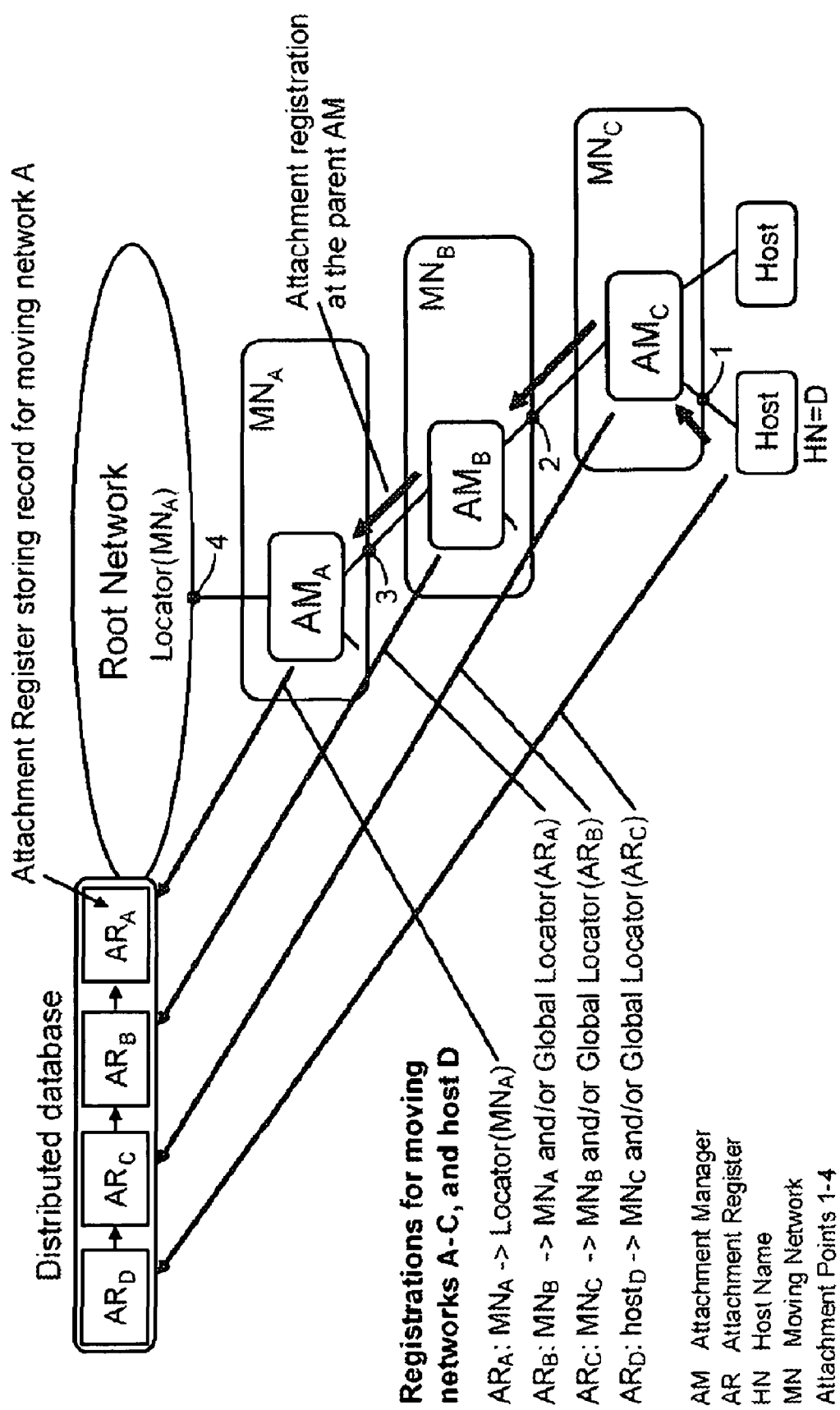
FIG. 3 illustrates a non-limiting example of mobility registration using globally-reachable and logically linked attachment registers.

FIG. 3 illustrates an example, non-limiting internetwork having a tree type hierarchical structure where the networks happen to be mobile networks and the hosts are mobile. The highest level network in this tree topology is called a root network. To resolve a name of a host or a mobile network to a global locator to that information can be directed to that host or mobile network requires that a registration procedure be performed. Attachment registers for mobile networks A-C and host D are shown. The name of the next highest level network, called here a parent network, to which the host or mobile network is attached is stored in the mobile network's corresponding attachment register. If the parent network is the root network, then the global network locator of the point of attachment to the root network is stored in that network's attachment register.

FIG. 3 illustrates example registration entries that may be stored in the attachment registers for mobile networks A-C and for host D. The diagonal lines to the attachment registers indicate that the attachment registers are globally reachable by the host D and by the attachment managers in the mobile networks. In an optional embodiment, some or all of that registration information may be stored in an Attachment Manager (AM) of the parent network. So, for example, host D registers with attachment register $AR_D$ and may also register with the attachment manager $AM_C$ in the parent node for host D corresponding to mobile network $MN_C$. The registration in each attachment register includes its name (e.g., $AR_D$) and a pointer to the attachment register of the parent network (e.g., $AR_C$). That pointer may point to the parent network by name and/or a global locator of the attachment register corresponding to the parent network. For example, a global locator for the attachment register $AR_C$ for parent network $MN_C$ may be stored in attachment register $AR_D$. Optionally, the registration in an attachment register may include the local locator of the point of attachment to the parent network. For example, $AR_D$ may include a registration that host D is connected to a point of attachment in $MN_C$ that is addressed using a local locator that is unique only within the context of $MN_C$. Host D can learn this local locator from $MN_C$ when attaching to this network, and then register it in the attachment register $AR_D$.

In a similar fashion, mobile network $MN_C$ registers with its attachment register $AR_C$ by storing the name $MN_B$ of the mobile parent network to which it is attached and/or the global locator of the attachment register $AR_B$. Optionally, the local locator of the point of attachment to the parent network is also stored. Mobile Network $MN_C$ may optionally also register with an Attachment Manager $AM_B$ located in mobile parent network $MN_B$ by storing similar information at the Attachment Manager $AM_B$. This type of registration procedure is performed by every mobile network and host in the tree that has a corresponding attachment register. But this registration is not as onerous as a typical registration. Advantageously, only local information related to the closest parent (or child) network is stored in an attachment register and optionally an attachment manager. There is no need to propagate the registration above the closest parent network. The big benefit then comes when location registrations must be updated. As will be explained further below, a mobility registration update for host or network only requires that the information in the corresponding attachment register (and attachment manager) be updated.

Name resolution based on the attachment registers and previously registered networks and hosts is now described. One example name resolution procedure is an iterative name resolution described in conjunction with FIG. 4 which continue with the non-limiting example relating to host node D from FIG. 3. Host F wants to reach host D. In step 1, the locator to a host D is resolved by querying a DNS server or other name resolution server with attachment register $AR_D$ for host D. The DNS can be modified to include records for locators to Attachment Registers. In step 2, the DNS returns "locator($AR_D$)" of the attachment register $AR_D$ for host D. Using the resolved locator, host F queries the attachment register $AR_D$ in step 3, which returns the name of the parent network $MN_C$ to which host D is attached in step 4. If a global locator for the attachment register $AR_C$ of mobile network C is also optionally stored in the attachment register $AR_D$, that global locator is also returned.

In steps 5 and 6, the name of the network $MN_B$ to which $MN_C$ is attached is resolved. The host F queries attachment register $AR_C$ in step 5, which returns the name of the mobile parent network $MN_B$ to which mobile network $MN_C$ is attached in step 6. If a global locator for the attachment register $AR_B$ of mobile network B is also optionally stored in the attachment register $AR_C$, that global locator is also returned. Host F proceeds in the same fashion with the name resolution in steps 6-9 until the mobile or other network at the root of the tree and its attachment point to the root network is found in step 10. In this case, mobile network A is attached to the root network at the root attachment point 4. That root attachment point 4 can be addressed using a global locator "locator($MN_A$)." At this point, the name host D has been completely resolved, and a communications bearer is established in step 11 between host F and host D using the following global locator "locator($MN_A$)/$MN_B$/$MN_C$/HostD This string should be understood as a symbolic representation of any hierarchical locator format that represents the path from the root of the tree to host D. For example, each locator, network, and host name may be mapped to a binary number. The global locator can then be represented by a concatenation of these binary numbers. Such a representation can then be mapped to a standardized address format, e.g., an IP address. The semantic content of this locator may be considered to be:

HostD @ $MN_C$ @ $MN_B$ @ $MN_A$ @ U where U is the attachment point of $MN_A$ to the root network.

Figure 4:
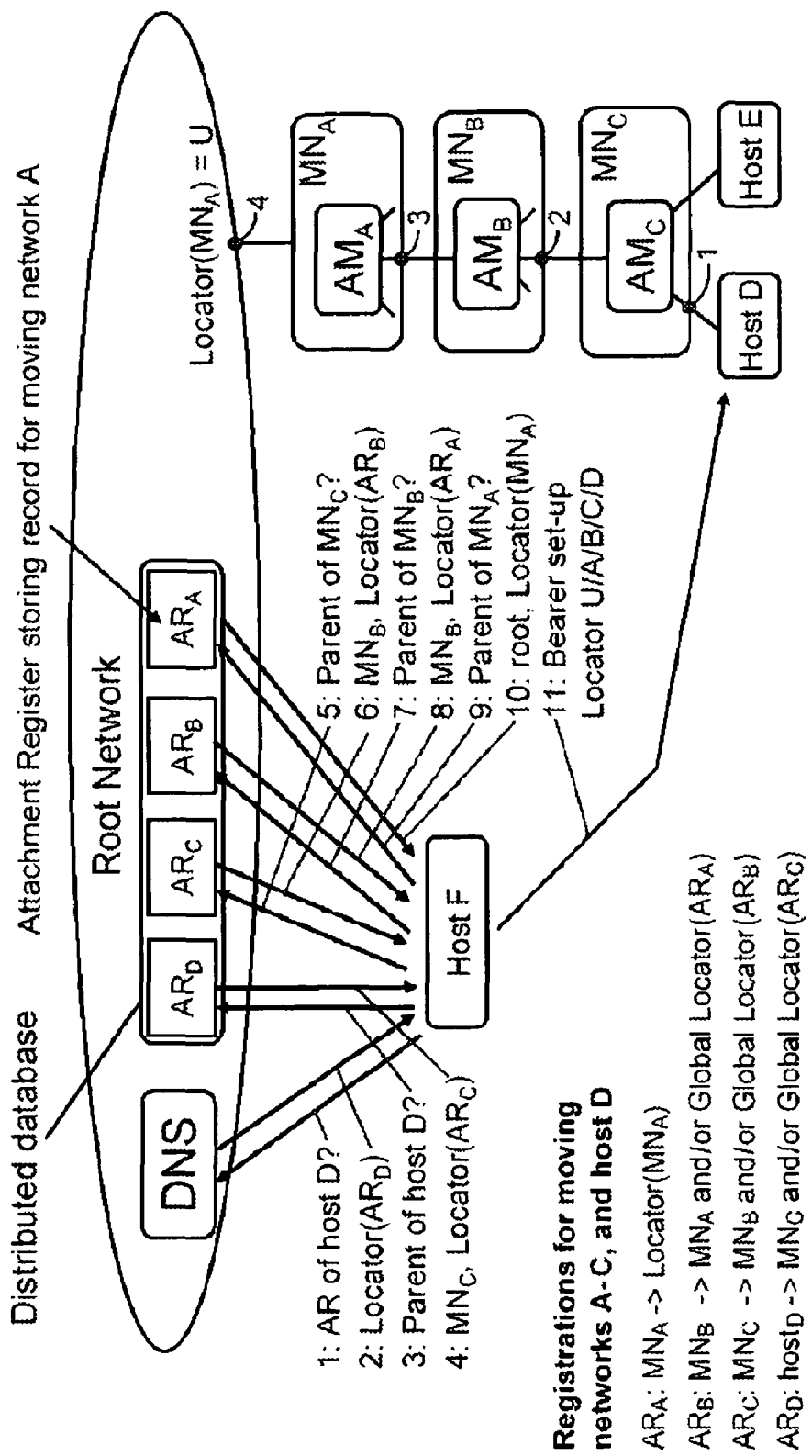
FIG. 4 illustrates a non-limiting example of an iterative name resolution procedure using globally-reachable and logically linked attachment registers.
Figure 5:
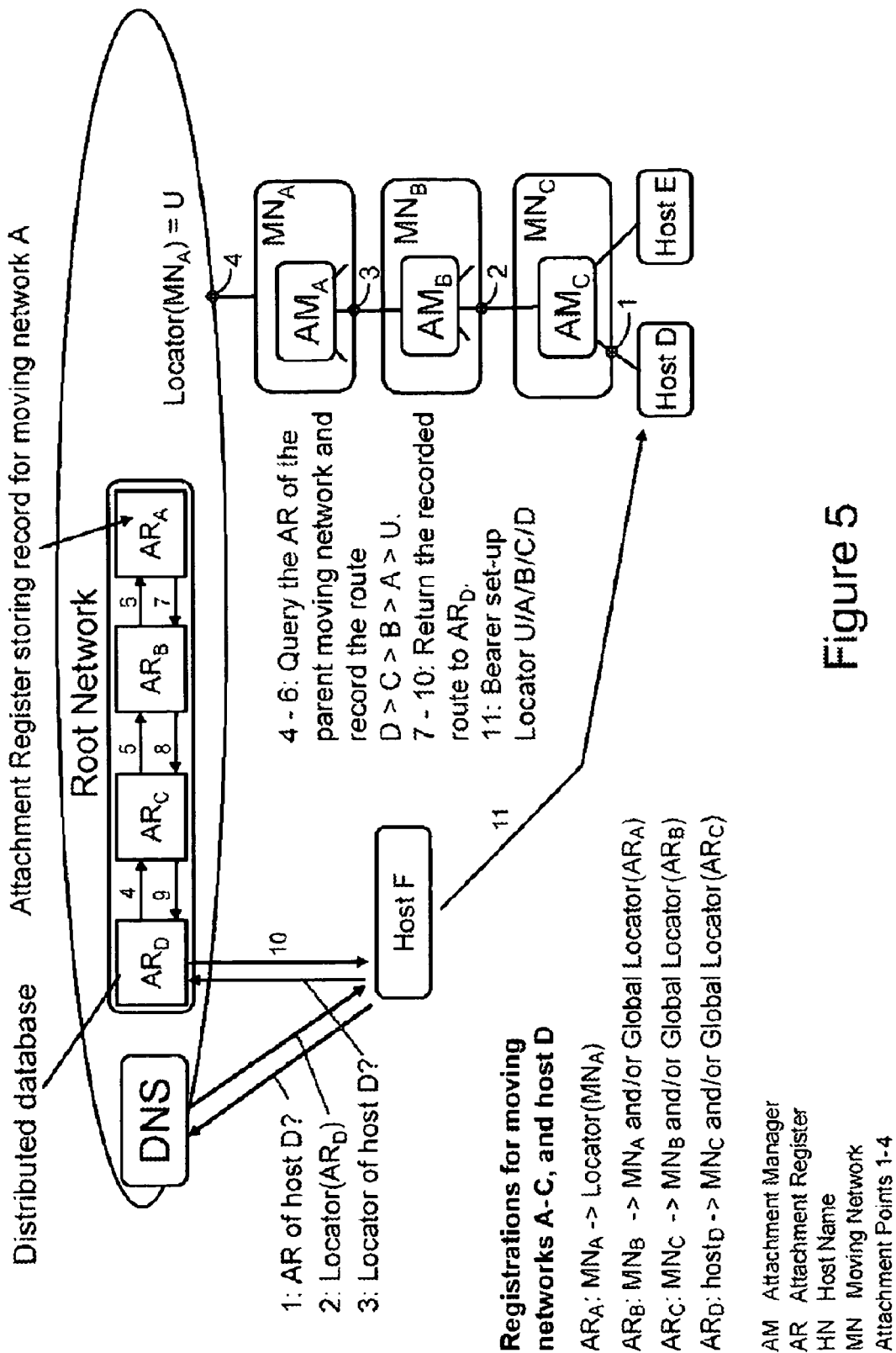
FIG. 5 illustrates a non-limiting example of a recursive name resolution procedure using globally-reachable and logically linked attachment registers.

So FIG. 4 illustrates name resolution done in an iterative fashion, where host F queries each attachment register based on the pointer obtained from the previous attachment register, and host F forms the global locator based on the sequence of network names or local locators obtained from the queries. The name resolution procedure may alternatively be performed in a recursive fashion as described now in conjunction with FIG. 5. In step 1, the locator to a host D is resolved by querying a DNS server or other name resolution server with attachment register $AR_D$ for host D. The DNS can be modified to include records for locators to Attachment Registers. In step 2, the DNS returns "locator($AR_D$)" of the attachment register $AR_D$ for host D. Using the resolved locator, host F queries the attachment register $AR_D$ in step 3. The attachment register $AR_D$ takes over from here and queries the attachment register $AR_C$ of the host's parent network $MN_D$ in step 4. Similarly, the attachment register $AR_C$ queries the attachment register $AR_B$ of its parent network $MN_B$ in step 5, and the attachment register $AR_B$ queries the attachment register $AR_A$ of its parent network $MN_A$ in step 6. This records the path from the host to the root network as D→C→B→A→U. In steps 7-10, the recorded path or route is returned to attachment register $AR_D$ and sent to correspondent host F. The communications bearer can then be set up in step 11 between host F and host D using the following global locator "locator($MN_A$)/$MN_B$/$MN_C$/hostD (U/A/B/C/D). Alternatively, attachment register $AR_A$ may return the result directly to host F. Hybrids of the iterative and recursive approaches are also possible, e.g., $AR_D$ performs an iterative name resolution procedure on behalf of host F. In both the iterative and recursive name resolution procedures, a forwarding agent may initiate the procedure instead of host F.

Continuing here with the example of FIG. 3, the global locator of the destination host D is formed by concatenating the global locator (e.g., locator($MN_A$) in FIG. 3) of the root network of the tree with the names of the networks (e.g., $MN_B$/$MN_C$/hostD) resolved in the name resolution procedure starting at the destination host at a leaf of the tree and ending at the root network. Only the names of the parent networks need be stored in the attachment registers or only global locators for the attachment registers of the parent networks need be stored in the attachments registers, or both can be stored. Indeed, storing the global locator of the attachment register of the parent network can expedite the name resolution procedure. For example, attachment register $AR_B$ stores both its parent network's name $MN_A$ and its parent network's attachment register global locator "locator($AR_A$)." The global locator of the parent network attachment register can then be obtained directly from the child network attachment register instead of resolving it via, e.g., the DNS, based on the parent network name.

Alternatively, the local locators optionally stored in the attachment registers can be used when forming the global locator of the destination host. In this case, the global locator for host D would be "global_locator($MN_A$)/$LL_{AB}$/$LL_{BC}$/$LL_{CD}$." Here, $LL_{AB}$ denotes the local locator of the network interface of $MN_A$ that $MN_B$ is attached to. This local locator is stored in $AR_B$. The local locators $LL_{BC}$ and $LL_{CD}$ are interpreted in a similar fashion, where the first index denotes the parent network being the context of the local locator, and the second index denotes the network or host that is attached to the point of attachment denoted by the local locator. These local locators are stored in attachment registers $AR_C$ and $AR_D$ respectively. The local locators registered in the attachment registers is sufficient to forward a packet down the network tree, since the local locator provides information about which point of attachment to forward the message to from each mobile network. When using local locators, the attachment manager does not need to be consulted regarding the name of the attached child network in the forwarding process. As an alternative, rather than storing local locators in the attachment registers, the child network can determine its parent network's local locator from the attachment manager (AM) of the parent network.

In yet another alternative, a host can communicate with its attachment register in the root network and with the attachment manager in its parent network without relying on a name resolution procedure. In the direction towards the root network, a default path is established. A packet sent by the host D along this path towards its Attachment Register can be used to record the name of each mobile network that the packet traverses on the default path. This network name information can then be used to route the packets sent in the reverse direction.

Figure 6:
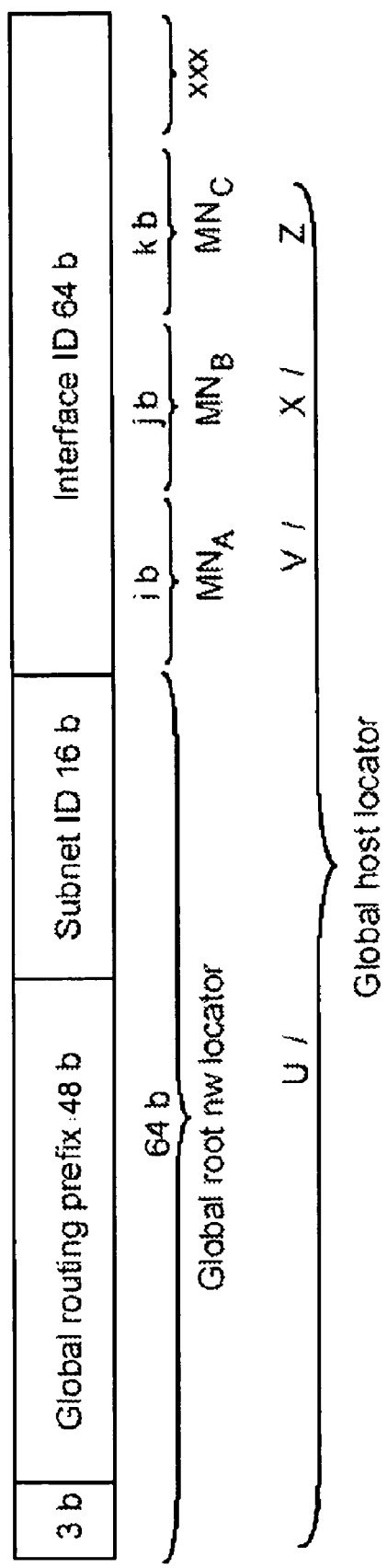
FIG. 6 illustrates a non-limiting example of locator coding in the IPv6 address architecture.

The ordered list of network names or local locators used to form a global locator for a destination host can be encoded into a binary string like an IP address. Each mobile network would then have a hierarchical IP address similar to an IP subnet. The local locator alternative is particularly suitable for this approach. FIG. 6 shows one non-limiting example where the global locator is mapped to the IPv6 global routing prefix (48 bits) along with a subnet identifier of 16 bits. Together, those two fields correspond to a global root network locator mapped to the IPv6 interface ID (64 bits). Each mobile network (A, B, and C) may have a fixed number of address bits (i, j, and k) corresponding to its number of leaf ports, and each leaf port may have a binary port number. The global locator of a mobile network or host is then formed by concatenating the binary encoded global locator of the point of attachment of the tree to the root network with the binary encoded local locators of each mobile network along the path to the addressed mobile network or host. The trailing bits beyond the global address denote potential but not attached mobile networks. These bits, labelled as XXX, are disregarded when the destination is reached. Routers in the mobile networks forward the packets based on traditional longest prefix match. For example, mobile network B in FIG. 4 has the prefix 4/3/2 stored in its routing table and forwards packets with this prefix to mobile network C. The prefix 4/3/2 is constructed by concatenating the local locators and can be binary encoded by assigning a specific number of bits to each number. For example, if four bits are assigned to every number, then 4/3/2 would be encoded as 010000110010. Conventional longest prefix matching can be used, for example, to route packets within a tree.

Figure 7A:
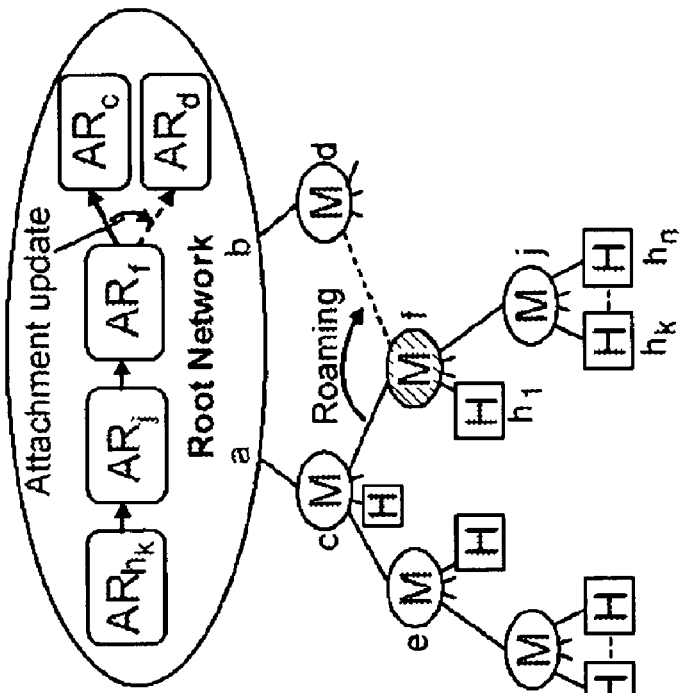
FIG. 7A illustrates a typical location update.

FIG. 7A shows a conventional location registration update situation. Mobile networks c, d, e, f, g, and j are interconnected in a hierarchical tree topology where the mobile networks c and d are attached at the points a and b, respectively, of a root network that includes a location register which stores a host address for each host H. The attachment points a and b can be addressed in the root network using a global locator. The attachment points a and b can also be reached by any host in the tree via a default path. Each mobile network M and each host H has a globally unique name. To send a data packet to a host, the host name must be resolved to a global locator. This global locator of the destination host is formed by concatenating the global locator of the attachment point at the root of the tree with the ordered list of networks between the root network and the destination host. To reach host $h_k$, the global locator is $a/c/f/j/h_k$ which must be stored in the location register LR mapped to the host's name. When the mobile network f roams from c to d with a new global locator $b/d/f/j/h_k$ mapped to the host's name, all of the hatched hosts and the mobile network j must update the location register. This may lead to a flooding of update signalling messages that must be routed ultimately to the location register LR. For example, if a train is carrying a 1000 hosts, then 1000 registration updates must be performed every time the train attaches to a new parent network.

These flooding problems along with other issues are avoided by the new name resolution scheme which uses Attachment Registers (AR) located for example in the root network. As will be described in conjunction with FIG. 7B below, each host and mobile network simply registers its location relative to its parent network in the hierarchical network topology. That way if the train in the above example carrying 1000 hosts changes its point of attachment, only the train needs to register its new location. The 1000 hosts do not have to perform any registration update.

Consider traditional location registers like Home Location Registers (HLR) or Home agents (in Mobile IP) that store the complete global locator of a host's or mobile network's current location. In contrast, an attachment register does not store absolute locators. Instead, the attachment register only stores the name of the network that the host or the mobile network is currently attached to. Each attachment register is reachable via a global address from any host or mobile network. When the locator of a host is needed, the host's name is resolved by querying a sequence of attachment registers until the network attached to the root network is found. Once this root-attached network and its global locator are resolved, the current routable locator of the host can be constructed by concatenating the locator of the root network with the ordered list of names of the networks that are traversed from the root network to the destination host at a leaf of the tree. The names of the traversed networks are returned by the attachment registers queried in a name resolution procedure. The absolute locator of a destination host is thus formed by concatenating the absolute locator of the root network with a sequence of network names (or alternatively with a sequence of local locators as described above) that describe the sequence of networks traversed from the root network of the tree to the destination host at a leaf of the tree.

Figure 7B:
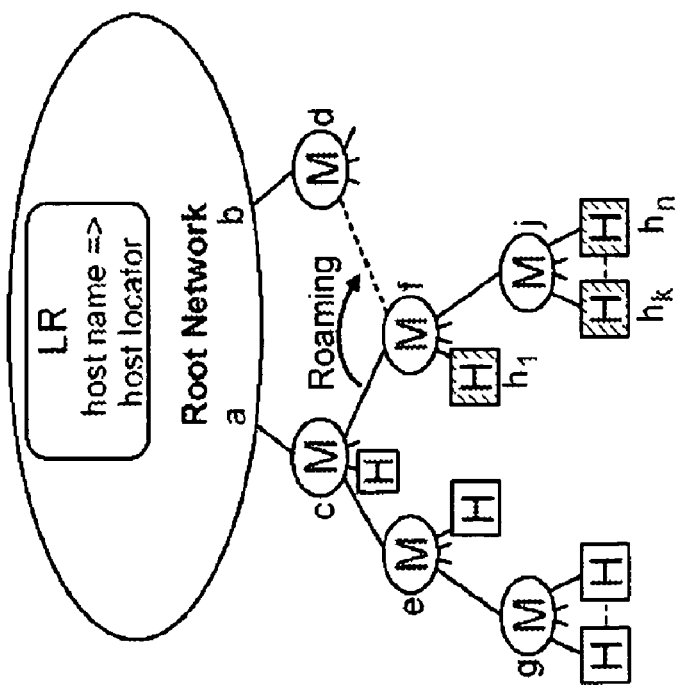
FIG. 7B illustrates a much simplified location update using globally-reachable and logically linked attachment registers.

FIG. 7B shows an application of this technology to the hierarchical network shown in FIG. 1. Again, the mobile network f roams changing its point of attachment from mobile network c to mobile network d. Rather than all of the hosts attached to mobile network f and j having to register a new host address for there names in the location register as was the case in the conventional approach shown in FIG. 7A, only the mobile network f hatched in FIG. 7B must update its attachment register $AR_f$ from $AR_c$ to $AR_d$. Further applications and examples (including the application to a GSM or 3G based cellular system, a multihoming application, dynamic ISP selection, and interdomain networking) are described in PCT application no. PCT/SE2007/050083, which is herein incorporated by reference, and will not be reproduced here.

As previously discussed, the present system is not restricted to the location of hosts, but can also be employed for arbitrary objects that can register with an AR in the network, either using its own network interfaces, or via the network interfaces of a neighbour. The system described addresses the problem of designing one common network mechanism for getting in touch with any traceable object. Here, "getting in touch with" means setting up a communication session with the object, or determining the physical location of the object, by performing the following functions:
[0063] resolve the name of the destination object to its current network address [0064] determine the optimal network path between the source and the destination [0065] (possibly) determine the physical location and the optimal physical path to the destination.

To be traceable, an object must have a globally unique name and be able to register with a network node. Non-limiting examples of an object include a human being, a hosts or terminal, such as a mobile phone or laptop, a network, such as a PAN, or VAN, a data file, a physical container of information such as a book, a sensor, a vehicle, a piece of merchandise, a communication session, such as a phone call, an application instance, a physical location such as a conference room or a hotel room, and any physical object that can register with a network node using e.g. an RFID tag, a PIN code, or a bar code.

Figure 8:
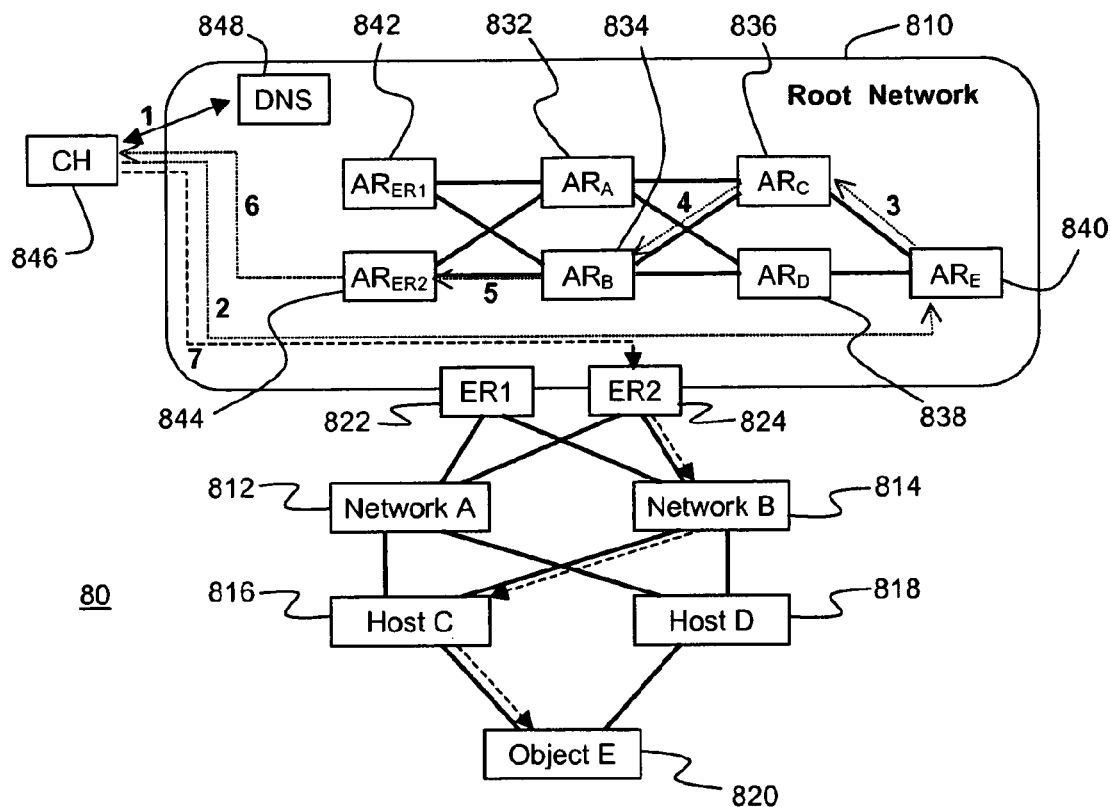
FIG. 8 is a block diagram illustrating how the attachment registers can be extended to include objects without direct network interface.

FIG. 8 illustrates how the mechanism is extendable to any object in an internetwork 80. The internetwork 80 includes a root network 810, mobile networks 812, 814, hosts 816, 818 and an object 820. Two edge routers 822, 824 provide access to the root network 810. The root network contains attachment registers 832-844 with links to the mobile networks, hosts, object and edge routers.

In the figure, solid lines represent dynamic binding between neighbouring objects, and corresponding dynamic binding between attachment registers. Dotted lines represent the locator construction path and dashed lines represent the data path. It will be noted that several paths are available from the root network 810 to object E 820. The figure shows the path via edge router ER2 824, network B 814 and host C 816. Dotted lines represent the locator construction path. In the event that a correspondent host (CH) 846 wishes to get in touch with object E 820, a clearly defined sequence of events follows.

The initial step of finding the object name is not shown in the figure. The object name is assumed to include a substring that can be resolved by a name resolution system such as DNS into a semi-static global locator that is used to locate the attachment register of the object. In this example, DNS is used in the first step, but other types of name resolution mechanisms, including distributed hash tables, could be used. The remaining steps in the name location are as follows:

1. The correspondent host 846 uses DNS to resolve the name of object E 820 into the global locator of its attachment register ($AR_E$) 840. In this example it is assumed that DNS resource records are defined for this type of semi-static information associated with an object's attachment register.
2. The correspondent host 846 uses the global locator of $AR_E$ 840 retrieved in the previous step to make a global locator construction request to this attachment register.
3. $AR_E$ 840 adds the name of object E to the global locator construction request and forwards it to the attachment register that represents the object that is located on the path towards the root network that is decided by the policy routing protocol, which in this case is the attachment register 836 of host C ($AR_C$).
4. $AR_C$ 836 adds the name of host C to the global locator construction request and forwards it to the attachment register that represents the object that is located on the most optimal path towards the root network, in this case the attachment register 834 of mobile network B ($AR_B$).
5. $AR_B$ 834 adds the name of mobile network B to the global locator construction request and forwards it to the attachment register that represents the object that is located on the most optimal path towards the root network, in this case the attachment register 844 of Edge Router 2 ($AR_{ER2}$).
6. $AR_{ER2}$ 844 adds the name of Edge Router 2 to the global locator construction request and forwards it to the Correspondent Host 846.
7. Based on the names of the objects in the retrieved global locator construction request, the global locator for object E is constructed:
   Object E @ Host C @ Network B @ ER 2.
   This global locator is used by the Correspondent Host to initiate a communication session with object E.

The communication session between the Correspondent Host and object E does not need any indirection via a mobility agent, which reduces the end-to-end delay. In the simplest case, the communication session may consist of reading a bar code or RFID tag.

For telephony, object E may be the destination end user, in which case the phone call is routed to the host (e.g. mobile phone or laptop) that this end user has registered as its preferred host (most optimal neighbour for telephony).

The name resolution mechanism described above does not rely on the registration of complete global locators. Instead, the global locator is constructed on demand based on the information in the attachment registers. The scalability problem of updating the global locator registrations in the name resolution system for all objects having global locators affected by a mobility or re-homing event of a large mobile network can thus be avoided. Only the object that changes its attachment to a neighbour must update its attachment register.

To reduce the construction time of the global locators, the result of the locator construction procedure can be cached, in a similar manner to that employed by DNS. For example, the attachment register 844 of an edge router may forward the result of the locator construction for the destination host 820 not only to the correspondent host 846, but also to the attachment register 840 of the destination host. The result can be cached by this register and returned to any correspondent host that requests the construction of a locator to the destination host 820.

Thus each host, mobile network, and edge router registers its neighbours with its associated attachment register as described above. In addition, any arbitrary object that can communicate with a host via e.g. a bar code, an RFID tag, or a PIN code can use a host as a proxy for registration with an attachment register associated with the object. Moreover, data objects such as data files stored in a host can also have an associated attachment register in the root network. The host then acts as a proxy for the data object when registering the neighbours of the data object with the attachment register of the data object.

Arbitrary objects typically do not have internetwork interfaces of their own, and can therefore not initiate a registration with an attachment register. Therefore, the host acting as a proxy for the object must initiate the registration. Likewise, due to their limited processing capability, an arbitrary object does not have the capability to keep a record of all its neighbours. Therefore, by default the host that acts as a proxy for an object is also the only neighbour that this host registers, i.e. the proxy typically only registers itself as a neighbour to the object. An object may have several proxies. The proxy host also performs the regular registration procedure with its own attachment register, where it registers its neighbours, including the neighbour object that it is acting as a proxy for. The registration procedure for Object E shown in FIG. 8 is illustrated in FIG. 9.

Figure 9:
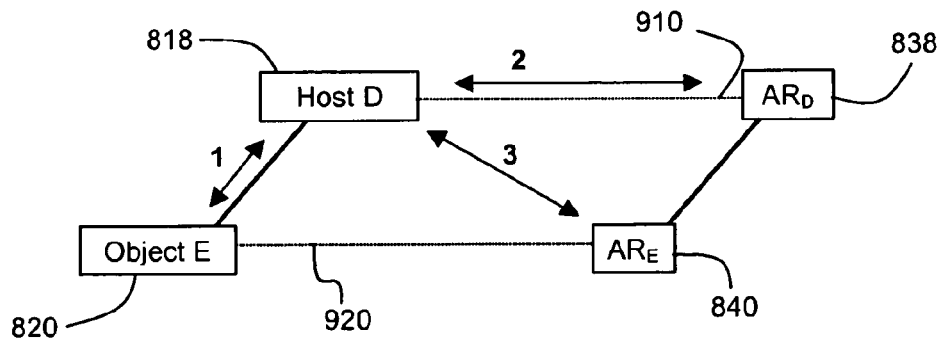
FIG. 9 illustrates the logical associations between arbitrary objects and their attachment registers.

In FIG. 9, the logical associations 910, 920 betweens objects 818, 820 and their respective attachment registers 838, 840 are shown. The registration procedure is as follows:
1. Attachment registration of Object E.
2. Registration of Object E as a neighbour of Host D.
3. Registration of Host D as neighbour of Object E.

It will be noted that the registration in attachment register $AR_E$ is performed by Host D.

Thus the global locator of a host is constructed using a sequence of neighbour relations between the destination object and a sequence of objects along a path to an edge router, plus the global locator of the edge router. This information is sufficient to construct the global locator for the destination object, for example a global IP address of a host.

In a similar fashion, the global (geographical) position for a destination object can be constructed based on a sequence of relative positions between a destination object and a sequence of objects along a path to an object for which a global position can be determined. For example, returning to the example of FIG. 8, suppose that object E 820 is spatially close a host D 818. This fact can be defined as a spatial relationship between the object E and host D (the spatial relationship that E is close to D). This spatial relationship is registered in the attachment registers when registering object E as a neighbour to host D. Host D, in turn, may be attached to a vehicular network B 814 with a global position registered for it, e.g. using the GPS function of the navigation system of a car. The spatial relationship between the host and the vehicular network is also close to, and this is registered in the attachment registers when registering the host as a neighbour to the vehicular network. The global position X of the vehicular network determined via GPS is also registered by the vehicular network in its attachment register.

Based on the position information in the attachment registers, the global position of the destination object E 820 can be constructed in parallel with the construction of the global locator in steps 1-6 shown in FIG. 8. In addition to returning the global locator to the Correspondent Host 846 in step 6, the global position is also returned. The semantics used to describe the global position of the destination object in this example is: destination object E is close to host D, which is close to the absolute position of vehicular network B. This can be abbreviated to: destination object E is close to global position X.

In another example, the destination object may be close to a fixed host that has, for example, a room ID and a postal address assigned to it. This global position Y is registered in the attachment register of the host. Step 6 in FIG. 8 would then return: destination object E is close to global position Y.

It will be noted that, when the Correspondent Host requests both the construction of the global locator and the global position of the destination host in step 2 in FIG. 8, each of the two requests may result in a separate construction path between the Attachment Register of the destination object and the Attachment Register of an Edge Router. This is illustrated by the fact that the global constructor described above involved the use of host C 816, whereas the determination of global position used host D 818. This may arise. For example, when the determination of the global position of the destination object requires that the construction path traverses an attachment register that has the global position registered for its associated object. On the other hand, the construction of the global locator may be based on transport QoS criteria. Determining the appropriate construction path for a specific global locator or global position request is thus a matter of policy routing among the attachment registers.

Figure 10:
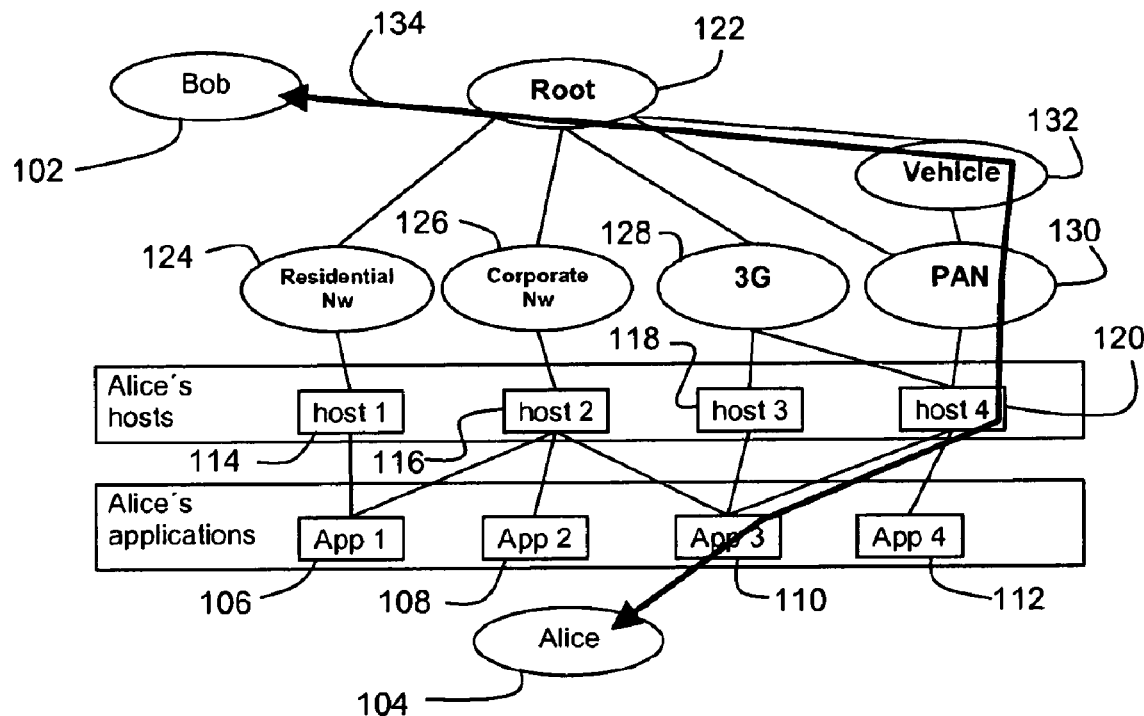
FIG. 10 is a block diagram illustrating policy routing based on presence information of users.

Policy routing can be understood by reference to FIG. 10. Consider the situation where Bob 102 wishes to contact Alice 104. Alice 104 has the use of four applications 106-112 supported by four hosts 114-120 which can she can use to connect to a root network 122 via various combinations of five mobile networks 124-132. The mobile networks include a residential network 124, corporate network 126, 3G network 128, PAN 130 and VAN 132. Alice 104 uses any of the hosts 114-120 to ensure that her presence information is registered in her attachment register (not shown). For example, Alice's preferred communication application may be email, represented as "App 3" 110 in the figure, which is supported by hosts 2, 3, and 4 116-120. If Alice is currently spatially close to host 4, this presence information is expressed in terms of abstract neighbour relations.

In addition, the fact that a specific application is supported by a set of hosts is expressed as a neighbour relation in the attachment registers of that application and its hosts. Alice's preferred application, geographical nearness to a host, and the support of the preferred application by this host are thus abstracted to neighbour relations that can be used for routing purposes. For example, a session initiation from Bob 102 to communicate with Alice 104 using the application 110 and host 120 that is most convenient for Alice can now be routed 134 via the application and host of Alice's preference using the neighbour information in the attachment registers of Alice 104, Alice's applications 106-112, and Alice's hosts 114-120 respectively. The routing is thus carried out on the basis of Alice's presence, Bob's presence, host mobility and user mobility, together with Alice's preferences. Alternatively, Bob can specify the application that he prefers in a session initiation message, and the policy routing mechanism will route via this application, and via a host that is close to Alice.

The routing between Alice and Bob can be based on one generic type of attachment register used for the network entities as well as for the applications and end users. Also, the neighbour relations stored in these attachment registers, and the policy routing protocol operating between the same registers, is of a generic type, where only the parameters differ between the various types of objects.

Figure 11:
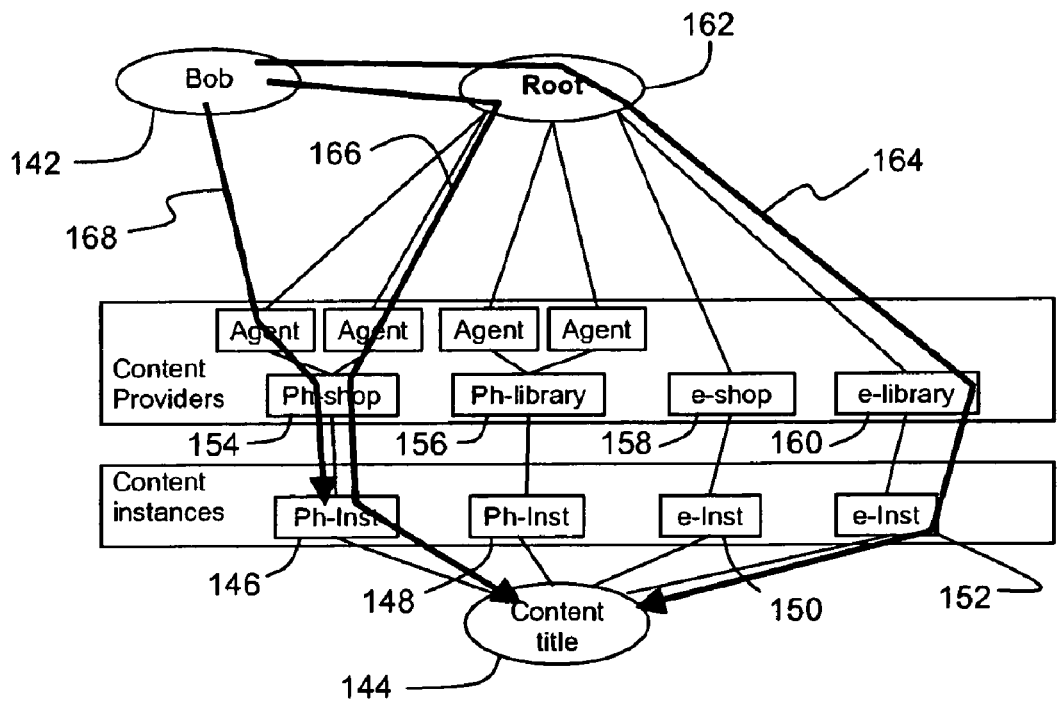
FIG. 11 is a block diagram illustrating policy routing based on users' preferences.

A further example of policy routing is illustrated in FIG. 11, which shows parts of an internetwork involved where Bob 142 retrieves an information object, for example the content of a book. The book title 144 has an attachment register that describes abstract neighbour relations to various manifestations or instances of the book 146-152, for example physical 146, 148 or electronic 150, 152 copies of the book. Each instance of the book has an attachment register that describes the abstract neighbour relations to various providers, for example book stores 154, libraries 156, e-shops 158 or e-libraries 160. If the instance is a physical copy, the provider's attachment register describes a neighbour relation to an application and a host via which an agent of the provider can be reached, for example a phone number to a book store. If the instance is an electronic copy, the attachment register of the provider describes a neighbour relation to a host (server) from which the book can be downloaded.

Bob's preferences can be expressed in terms of the preferred type of manifestation (physical or electronic), physical location, preferred provider, etc. These preferences are processed by a policy routing protocol to find a manifestation of the book that matches Bob's preferences. For example, Bob may express a preference to borrow an e-book. The locator construction and routing will start at the attachment register of the book title 144. The policy routing principles can then be applied to find a path 164 from this attachment register to the attachment register of an edge router of the root network 162 via attachment registers of an e-instantiation 152 of the book, and an e-library 160. This path 164 between the Attachment Registers is used for constructing the desired global locator to an e-instantiation of the book in an e-library, which is used when Bob downloads the book.

Alternatively, if Bob would prefer to go to a shop 154 to buy a physical copy 146 of the book, the policy routing principles can be applied to find a path 166 from the attachment register of the book title 144 to the edge router via attachment registers of the physical copy 146 and shop 154, and thus a global locator. A path 168 determining the geographical location of the physical copy 146 may also be retrieved at the same time, as described above.

Returning now to FIG. 10, consider the session initiation between Bob 102 and Alice 104. This procedure can commence after the correspondent host has retrieved the global locator of the destination object. For an interactive application such as telephony, a legacy session initiation protocol can be used, such as SIP (RFC 3261). However, it is also possible to reduce the total number of signalling messages, and to improve the security, by integrating the session initiation procedure with the locator construction procedure. This integration is illustrated in FIG. 12.

Figure 12:
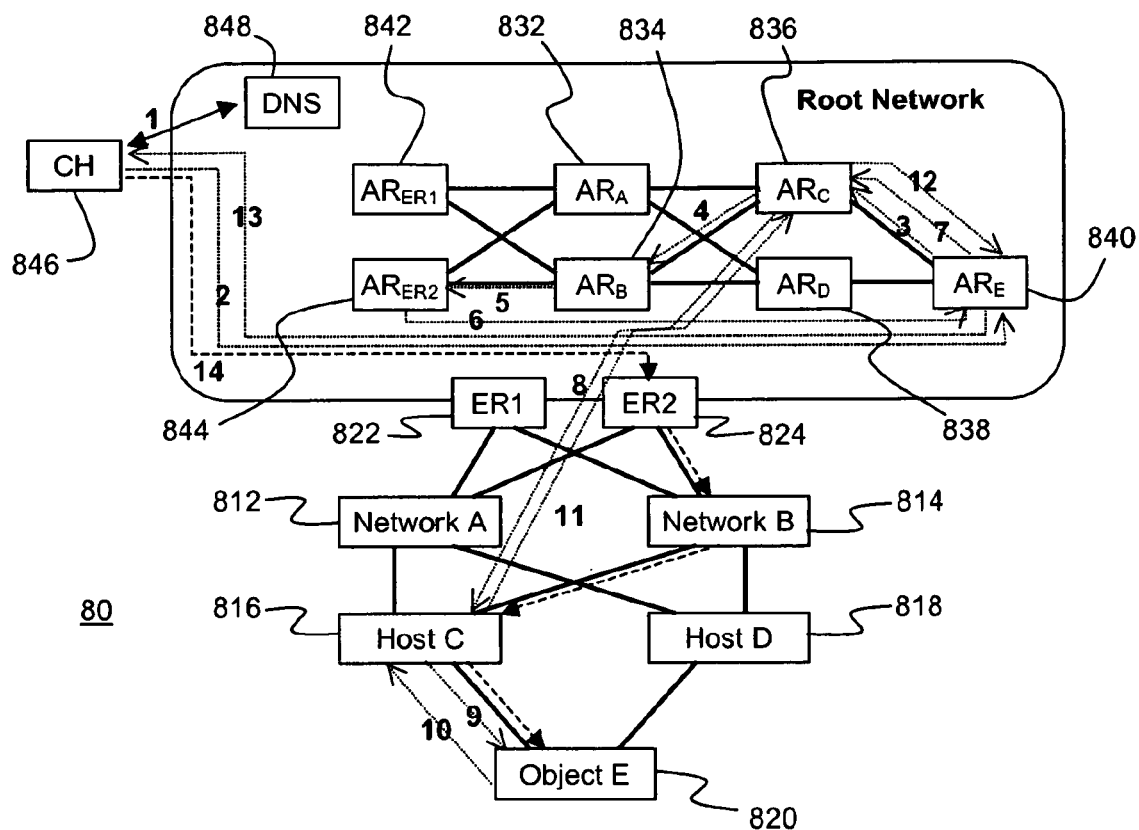
FIG. 12 is a block diagram illustrating the signalling required for integrated session initiation and locator construction.

FIG. 12 is a representation of the internetwork 80 shown in FIG. 8, with the integrated session initiation and locator construction procedure shown as a dotted line. The data path is unchanged compared to FIG. 8 and is again shown as a dashed line.

The integrated procedure is described by the following steps:
1. As in the example of FIG. 8, the correspondent host 846 uses DNS to resolve the name of object E 820 into the global locator of its attachment register ($AR_E$) 840. In this example it is again assumed that DNS resource records are defined for this type of semi-static information associated with an object's attachment register.
2. The correspondent host 846 uses the global locator of attachment register $AR_E$ 840 retrieved in the previous step to send a session initiation request to $AR_E$ 840.
3. $AR_E$ 840 performs a policy and security control of the session initiation request based on the credentials of the correspondent host 846, and the object (not shown) for which the correspondent host 846 is a proxy. If the policy control succeeds then, as in FIG. 8, $AR_E$ 840 adds the name of object E to a global locator construction request and forwards it to the attachment register that represents the object that is located on the most optimal path towards the root network, which in this case is the attachment register 836 of host C ($AR_C$).
4. As in the example of FIG. 8, $AR_C$ 836 adds the name of host C to the global locator construction request and forwards it to the attachment register that represents the object that is located on the most optimal path towards the root network, in this case the attachment register 834 of mobile network B ($AR_E$).
5. As in the example of FIG. 8, $AR_E$ 834 adds the name of mobile network B to the global locator construction request and forwards it to the attachment register that represents the object that is located on the most optimal path towards the root network, in this case the attachment register 844 of Edge Router 2 ($AR_{ER2}$).
6. $AR_{ER2}$ adds the name of Edge Router 2 to the global locator construction request and forwards it to $AR_E$ 840.
7. Based on the names of the objects in the retrieved global locator construction request, $AR_E$ 840 constructs the global locator for object E:
   Object E @ Host C @ Network B @ ER 2.
   From this locator the global locator for host C is derived:
   Host C @ Network B @ER 2.
   $AR_E$ now sends a session initiation request to the attachment register of the host that has been selected by the policy routing protocol, i.e. to the attachment register 836 of host C. The global locator of host C is passed with the session initiation request.
8. Using the global locator of host C, $AR_C$ 836 sends an alert message to host C 816.
9. Host C 816 alerts object E 820, i.e. the object for which host C is a proxy. In this example this is the end user Alice.
10. Alice (object E) 820 accepts the alert, e.g. by signalling "off hook".
11. Host C 816 sends an alert acknowledgement to $AR_C$ 836.
12. $AR_C$ 836 sends a session initiation acknowledgement to $AR_E$ 840.
13. $AR_E$ 840 sends a session initiation acknowledgement and the global locator of object E to the correspondent host 846.
14. The global locator is used by the correspondent host 846 to send user data to object E 820.

The integration of locator construction and session initiation allows for policy and security control before the global locator is returned to the correspondent host 846.

It will be appreciated that a number of variations are possible in the signalling sequence described above. For example, in step 7, $AR_E$ 840 may alert host C 816 directly. However, in general only $AR_C$ will a sufficiently close trust relation to be authorised to alert host C.

As previously discussed, the result of the locator construction procedure may be cached if, for example, the attachment register 844 of an edge router forwards the result of the locator construction for the destination host 816 to the attachment register 840 of the destination host, so that the result can be cached by this register and returned to any correspondent host that requests the construction of a locator to the destination host 816. Caching works well with the session initiation procedure just described, since the result of the locator construction procedure is returned to the Attachment Register of the destination host for other purposes in step 6 of FIG. 12. The caching of the result can then be performed without any extra signalling required.

There are many advantages to the attachment register based network management. A common name resolution and global locator framework for all objects that can register with a network has been introduced. Such objects include regular network entities such as mobile networks, hosts, mobile phones, and laptops. However, a significant advantage relative to existing technologies is that all types of objects that can be identified via a network terminal, such as objects with bar codes, PIN codes, data file IDs, or RFID tags, can be included within the same framework as the network entities. This common name resolution and global locator framework enables synergies that cannot currently be exploited due to the multitude of separate object registration frameworks.

The name registration and resolution scheme described above reduces the mobility registration signalling caused by mobility among the mobile objects. In traditional mobility solutions the global locator of a host is stored in a location register or mobility agent. Such entities must be updated as soon as the global locator is changed. By contrast, the present technology requires only that the Attachment Register of the object directly involved in a mobility event be updated. Roaming of a large mobile network with many attached subnetworks and hosts will thus not require roaming signalling for every attached object. However, end objects that have ongoing sessions need to be updated if there is a mobility event along the path of the session.

The scheme allows for distribution of the responsibility for object registrations. Each object can have a dedicated Attachment Register. There is thus no need for a centralized business role that handles the object registrations. Each object may own and manage its own Attachment Register. Alternatively; business models with centralized solutions can also be supported. For example, an operator can own and manage all the attachment registers of the objects of its customers.

The system allows for determining the global geographical position of the destination object using the same mechanisms as for constructing its global locator. The global locator and position can even be determined concurrently.

Although various embodiments have been shown and described in detail, the claims are not limited to any particular embodiment or example. None of the above description should be read as implying that any particular element, step, range, or function is essential such that it must be included in the claims' scope. The scope of patented subject matter is defined only by the claims. The extent of legal protection is defined by the words recited in the allowed claims and their equivalents.

The invention claimed is:

1. A method for use in an internetwork of interconnected communications networks, comprising:
   providing a set of globally-reachable attachment registers, each attachment register corresponding to an object in the internetwork;
   storing information in the attachment registers establishing one or more logical links between attachment registers, each logical link between attachment registers corresponding to a communication link between neighbouring objects in the internetwork, a plurality of logical links between attachment registers forms a logical path between a source object and a destination object; and
   determining a locator for the destination object in the internetwork by identifying a logical path to the destination object, along the logical links between attachment registers corresponding to the identified logical path, from a destination attachment register corresponding to the destination object.

2. The method of claim 1, wherein, for each object, communication links to neighbouring objects are registered with the corresponding attachment register of that object.

3. The method of claim 2, wherein passive objects in the internetwork lacking a network interface are associated with proxy active objects, and wherein the proxy active objects register communication links with attachment registers on behalf of their associated passive objects.

4. The method of claim 1 wherein objects in the internetwork include one or more of the following: networks, hosts, terminals, passive objects, human beings, data files, sensors, vehicles, merchandise, physical locations.

5. The method of claim 3, wherein passive objects are registered by the proxy active objects, the passive objects are registered using a readable medium including one of an RFID tag, PIN code or bar code.

6. The method of claim 1, wherein, when one object changes from a first point of attachment at a first neighbouring object to a second point of attachment at a second neighbouring object, the method further comprises:
   updating the attachment register corresponding to the one object to change a logical link from the attachment register corresponding to the first neighbouring object to the attachment register corresponding to the second neighbouring object.

7. The method of claim 1, wherein the locator is constructed in a name resolution of the destination object.

8. The method of claim 1, wherein the locator identifies a physical location of the destination object.

9. The method of claim 1, wherein the locator identifies a preferred network path between a source object and the destination object.

10. The method of claim 8, wherein the locator identifies a preferred physical path to the destination object.

11. The method of claim 8, wherein some or all of the attachment registers include information identifying a physical location of their corresponding object or a relative physical location of their corresponding object compared to neighbouring objects.

12. The method of claim 1, wherein the determination of the logical path along logical links between attachment registers is conducted in accordance with a predefined policy of preferred objects to be included in locator construction.

13. The method of claim 1, wherein the step of determining a locator includes:
    sending a locator constructor request to the destination attachment register;
    at the destination attachment register, adding the name of the destination object to the location constructor request;
    forwarding the locator constructor request to another attachment register corresponding to a neighboring object closer to a root network in the internetwork than the destination object; and
    repeating the sending, adding, and forwarding until the locator constructor request is returned containing the names of all the objects corresponding to the attachment registers passed through by the locator constructor request.

14. The method of claim 13, wherein a session initiation request is sent to the destination attachment register at the same time as the locator constructor request.

15. The method of claim 1, wherein the step of determining a locator includes carrying out session initiation with the destination object.

16. The method of claim 1, wherein at least some of the objects are mobile.

17. A method for use in interconnected communication networks containing a plurality of objects, at least some of the objects each having a corresponding, globally-reachable attachment register, where there are logical links between certain ones of the attachment registers, the method comprising:
    querying one or more of the globally-reachable attachment registers to obtain or modify logical link information in the one or more globally-reachable attachment registers, the logical links between the attachment registers corresponding to a communication link between neighbouring objects in the interconnected communication networks, a plurality of logical links between attachment registers forms a logical path between a source object and a destination object, and
    using the logical link information to perform one or more network communications functions.

18. The method of claim 17, wherein at least some of the objects having corresponding attachment registers are passive objects without network interfaces.

19. A method for use in interconnected communications networks having a plurality of objects, comprising:

providing a set of globally-reachable attachment registers, where at least some of the objects each has a corresponding attachment register, and storing information in the attachment registers that establishes one or more logical links between the attachment registers, each logical link between attachment registers corresponding to a communication link between neighboring objects in the interconnected communications networks, a plurality of logical links between attachment registers forms a logical path between a source object and a destination object, wherein the logical links between certain ones of the attachment registers are useable to perform one or more network communication functions.

20. Apparatus for use in an internetwork of communications networks, comprising:

a group of globally-reachable attachment registers, each attachment register corresponding to an object in the internetwork, and electronic circuitry for storing information in the attachment registers that establishes one or more logical links between the attachment registers, each logical link between attachment registers corresponding to a communication link between neighbouring objects in the internetwork, a plurality of logical links between attachment registers forms a logical path between a source object and a destination object;

wherein the logical links between certain ones of the attachment registers are useable to perform one or more network communication functions.

21. The apparatus of claim 20, wherein the apparatus is arranged to determine a locator for a destination object by identifying a logical path, along the logical links between attachment registers, from a destination attachment register corresponding to the destination object.

22. The apparatus of claim 21, wherein passive objects in the internetwork lacking a network interface are associated with proxy active objects, and wherein the proxy active objects are arranged to register communication links with attachment registers on behalf of their associated passive objects.

23. The apparatus of claim 21, wherein objects in the internetwork include one or more of the following: networks, hosts, terminals, passive objects.

24. The apparatus of claim 23, wherein passive objects are arranged to register with a network node using a readable medium.

25. The apparatus of claim 21, wherein the locator is constructed in a name resolution of the destination object.

26. The apparatus of claim 21, wherein the locator identifies a preferred network path between a source object and the destination object.

27. The apparatus of claim 21, wherein the locator identifies a physical location of, or a preferred physical path to, the destination object.

28. The apparatus of claim 21, wherein some or all of the attachment registers include information identifying a physical location of their corresponding object or a relative physical location of their corresponding object compared to neighbouring objects.

29. The apparatus of claim 21, arranged so that a predefined policy of preferred objects to be included in locator construction are taken into account in the determination of the logical path along logical links between attachment registers.

30. The apparatus of claim 20, arranged to carry out session initiation at the same time as locator determination.

31. The apparatus of claim 20, wherein at least some of the objects are mobile.

32. The apparatus of claim 20, wherein, when one object changes from a first point of attachment at a first neighbour object to a second point of attachment at a second neighbour object, the electronic circuitry is configured to update the attachment register corresponding to the one object to change a logical link from the attachment register corresponding to the first neighbour object to the attachment register corresponding to the second neighbour object.

33. Apparatus for use in an internetwork of communication networks containing a plurality of objects, at least some of the objects each having a corresponding, globally-reachable attachment register, where there are logical links between certain ones of the attachment registers, the apparatus comprising electronic circuitry configured to:

query one or more of the globally-reachable attachment registers to obtain or modify logical link information in the one or more globally-reachable attachment registers, the logical links between the attachment registers corresponding to a communication link between neighbouring objects in the interconnected communication networks, a plurality of logical links between attachment registers forms a logical path between a source object and a destination object, and use the logical link information to perform one or more network communications functions.

34. The apparatus in claim 33, wherein the apparatus includes a correspondent host.

35. The apparatus in claim 33, wherein the apparatus includes one of the attachment registers.

36. The apparatus of claim 33, wherein at least some of the objects that have corresponding attachment registers are passive objects without network interfaces.

37. Apparatus for use in interconnected communications networks having a plurality of objects, comprising:

a set of globally-reachable attachment registers, each attachment register corresponding to an object from the plurality of objects;

and electronic circuitry arranged to store information in the attachment registers that establishes one or more logical links between the attachment registers, each logical link between attachment registers corresponding to a communication link between neighbouring objects in the interconnected communications networks, a plurality of logical links between attachment registers forms a logical path between a source object and a destination object, wherein the logical links between certain ones of the attachment registers are useable to perform one or more network communication functions.

* * * * *

UNITED STATES PATENT AND TRADEMARK OFFICE
CERTIFICATE OF CORRECTION

| | | |
|---|---|---|
| PATENT NO. | : 8,170,030 B2 | Page 1 of 1 |
| APPLICATION NO. | : 12/377914 | |
| DATED | : May 1, 2012 | |
| INVENTOR(S) | : Eriksson | |

It is certified that error appears in the above-identified patent and that said Letters Patent is hereby corrected as shown below:

In Fig. 7A & Fig. 7B, Sheet 6 of 9, delete "Moving Network" and insert -- Mobile Network --, therefor.

In Column 4, Line 18, delete "PANS" and insert -- PANs --, therefor.

In Column 8, Line 25, delete "links," and insert -- links --, therefor.

In Column 9, Line 61, delete ""locator($MN_A$)/$MN_B$/$MN_C$/HostD" and insert -- "locator($MN_A$)/$MN_B$/$MN_C$/HostD". --, therefor.

In Column 10, Line 21, delete "$MN_D$" and insert -- $MN_C$ --, therefor.

In Column 12, Line 14, delete "(AR)" and insert -- (ARs) --, therefor.

In Column 13, Line 3, delete "[0063]".

In Column 13, Line 4, delete "address [0064]" and insert -- address; --, therefor.

In Column 13, Line 5, delete "destination [0065]" and insert -- destination; and --, therefor.

In Column 15, Line 59, delete "arise. For" and insert -- arise, for --, therefor.

In Column 16, Line 4, after which delete "can", therefor.

In Column 17, Line 55, delete "($AR_E$)." and insert -- ($AR_B$). --, therefor.

In Column 17, Line 56, delete "$AR_E$" and insert -- $AR_B$ --, therefor.

In Column 19, Line 54, in Claim 4, delete "1" and insert -- 1, --, therefor.

Signed and Sealed this
Twenty-ninth Day of January, 2013

David J. Kappos
*Director of the United States Patent and Trademark Office*